United States Patent
Strunk et al.

(10) Patent No.: US 6,378,084 B1
(45) Date of Patent: Apr. 23, 2002

(54) ENCLOSURE PROCESSOR WITH FAILOVER CAPABILITY

(75) Inventors: Glenn W. Strunk, Ft. Collins; Michael J. Erickson, Loveland; Daniel V. Zilavy, Ft. Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/277,219

(22) Filed: Mar. 29, 1999

(51) Int. Cl.$^7$ ................................................. G06F 11/00
(52) U.S. Cl. ........................................... 714/2; 711/112
(58) Field of Search ................................ 714/2, 4, 5, 6, 714/7, 8, 10–12, 25, 31, 39, 42, 43; 711/112, 114; 709/201, 203

(56) References Cited

U.S. PATENT DOCUMENTS

| | | | | |
|---|---|---|---|---|
| 4,509,113 A | * | 4/1985 | Heath | |
| 4,710,926 A | * | 12/1987 | Brown et al. | 714/4 |
| 5,337,414 A | * | 8/1994 | Hashemi et al. | 710/52 |
| 5,471,586 A | * | 11/1995 | Sefidvash et al. | 710/104 |
| 5,560,033 A | * | 9/1996 | Doherty et al. | 713/340 |
| 5,586,250 A | | 12/1996 | Carbonneau et al. | 395/183.2 |
| 5,781,798 A | * | 7/1998 | Beatty et al. | 710/10 |
| 5,864,689 A | * | 1/1999 | Tran | 712/208 |
| 5,901,298 A | * | 5/1999 | Cummins et al. | 711/5 |
| 5,974,491 A | * | 10/1999 | Jung et al. | 710/106 |
| 6,038,680 A | * | 3/2000 | Olarig | 714/6 |
| 6,061,806 A | * | 5/2000 | Caldwell et al. | 714/3 |
| 6,173,374 B1 | * | 1/2001 | Heil et al. | 711/148 |
| 6,253,334 B1 | * | 6/2001 | Amdahl et al. | 714/4 |

\* cited by examiner

Primary Examiner—Nadeem Iqbal

(57) ABSTRACT

A device and method for enclosure processing of a dual SCSI bus enclosure is described. A single SCSI enclosure processor is provided on an adapter that can operate alone or in pairs to provide different modes of operation, including simplex, duplex, and cluster. When used in pairs, two adapters interconnect internally to the enclosure through internal cross-coupling bus repeaters. The adapters have the ability to automatically configure themselves. In the cluster mode, a first enclosure processor on a first adapter assumes an active status, while a second enclosure processor on a second adapter waits in a standby mode. The standby enclosure processor detects when the active enclosure processor has failed, misoperated, or been removed and automatically failover, assuming the identity of the active enclosure processor, without disruption to the system. Hot-swapping of the adapter boards is therefore possible.

18 Claims, 8 Drawing Sheets

ENCLOSURE PROCESSOR WITH FAILOVER CAPABILITY

TECHNICAL FIELD

The invention relates to computers and computer peripherals. More particularly, the invention relates to a computer enclosure processor with failover capabilities.

BACKGROUND ART

SCSI (small computer systems interface) is a commonly used parallel I/O (input/output) system for computers. Computers can be interconnected with peripherals or modules along a SCSI bus or SCSI channel. A common interconnection arrangement is a daisy chain, where the bus extends out of one module into the next peripheral. The number of modules on a SCSI channel is bound by a fixed upper limit (e.g., 8 or 16, including the host computer). Although ANSI (American National Standards Institute) standards documents exist for SCSI, many variations are possible and proprietary adaptations are common. For example, a SCSI-1 bus is a 50 conductor, single ended, parallel bus; a SCSI-2 bus is an extension of SCSI-1 to 68 conductors; and SCSI-3 is a faster, low voltage differential version of SCSI-2. SCSI requires termination at the ends of the bus, and the terminations may be either active or passive and may be either internal or external to the peripheral. Finally, a variety of SCSI connectors can be used.

FIG. 1 illustrates a computer system and various peripheral devices interconnected by a single SCSI I/O bus. A computer 100 includes two internal SCSI devices 102 and 104. The internal devices 102 and 104 might be, for example, a disk drive and a backup tape drive. Two external devices 106 and 108 are also connected to the SCSI bus. The external SCSI devices might be, for example, a printer and a scanner. In general, the SCSI bus system may have more or fewer devices. In the SCSI system illustrated in FIG. 1, the internal device 102 must provide a bus termination impedance. The internal devices 102 and 104 are typically connected by a ribbon cable with a single connector (for example, 110) for each device. The external devices 106 and 108 are typically connected by a series of double ended cables. A first cable connects a connector 112 on the computer 100 to the external device 106. A second cable connects the external device 106 to the external device 108. The external device 108 has an open connector 114 (no cable attached) that may be terminated with an external terminator plug 116 (mandatory for Plug and Play SCSI) or may be terminated internally to the device 108. The total length of a SCSI bus to a final termination must be less than a predetermined limit so as to ensure signal integrity along the entire bus.

Associated with each device on a SCSI bus is an adapter. An adapter is an interface between the SCSI channel and the device. For example, the computer 100 illustrated in FIG. 1 includes a host adapter 118. Peripheral devices 102, 104, 106, and 108 each contain a peripheral adapter (not shown). An adapter may be physically packaged as a circuit card, board, or any other suitable form. In addition, one or more of the various peripherals may include SCSI controllers and other processors, which may be located on the same card or board as the adapter.

The host or host adapter is the initiator of the SCSI bus, and the other modules or peripherals are targets. The initiator commands the targets on the bus to read or write data from/to the bus. Each device on the bus has a unique address that the host initiator uses to direct commands and facilitate data transfer.

One or more SCSI peripheral devices may form a single SCSI enclosure. For example, a SCSI enclosure may be a collection of storage units in the same physical housing, sharing a common power supply and cooling system. The degree of collocation of devices within an enclosure can vary depending upon the needs of the overall computer system. For example, all peripherals in a room may be treated as an enclosure. On the other extreme, a single circuit board or IC (integrated circuit) chip may be logically partitioned into several SCSI devices and the board or chip may be treated as an enclosure. A single SCSI device by itself may be an enclosure. Typically, an enclosure defines a common environment in which there is high correlation of environmental conditions from device to device within the enclosure. However, an enclosure need not be so constrained, and one skilled in the art would appreciate that other considerations may warrant combining and treating as an enclosure one or more peripherals that do not share a common physical environment.

SCSI devices within a SCSI enclosure may retain their logical identity as separate, devices, each individually accessible by address by the host computer. On the other hand, the enclosure itself may manage and hide the underlying devices and present a single composite device (single address) to the host computer.

A SCSI enclosure may have associated with it an enclosure processor. An enclosure processor is a processor that performs monitoring and control of the enclosure. An enclosure processor typically monitors power supplies, cooling fans, doors, temperatures, and individual device locks. An enclosure processor may also control displays and a keypad or other switches on a front panel of the enclosure. U.S. Pat. No. 5,586,250, issued to Carbonneau et al. on Dec., 17, 1996, and hereby incorporated by reference, describes an enclosure processor using the terminology "SMARt (status monitoring and reporting) means" and "CMAC (cabinet monitor and control) board".

An enclosure processor is typically a device on the SCSI bus, just like a peripheral device, with its own unique address. In this way, a host adapter can command and control an enclosure processor. To facilitate communications between a host adapter and an enclosure processor, a communications protocol may be implemented on top of the SCSI protocol. Two common protocols for use with an enclosure processor on a SCSI bus are the SAF-TE (SCSI accessible fault-tolerant enclosure) and SES (SCSI enclosure specification) protocols.

FIGS. 2–4 will next be described. FIGS. 2–4 depict various configurations of a SCSI peripheral enclosure 200 with enclosure processors. These configurations illustrate problems that the present invention solves. In FIGS. 2–4, the peripherals are disk drives and the enclosure includes an array of disk drives, such as might be employed in a RAID (redundant array of inexpensive disks) or JBOD (just a bunch of disks) system.

FIGS. 2–4 depict a remote disk storage enclosure 200 containing four SCSI disk drives 210–213 on a first SCSI bus 220 and four SCSI disk drives 230–233 on a second SCSI bus 240. Both buses 220 and 240 are attachable to the outside world through an adapter board 250. The adapter board 250 contains a SCSI enclosure processor (SEP) on each SCSI bus—SEP 252 on the first bus 220 and SEP 254 on the second bus 240. The adapter board 250 also contains one external host connection repeater on each SCSI bus—repeater 256 near the external connections to the first bus 220 and repeater 258 near the external connections to the second bus 240. Depending upon how external connections are made to the adapter board 250, the two SCSI bus systems of enclosure 200 can be utilized in a simplex, duplex, or cluster configuration, as will next be described.

FIG. 2 illustrates a simplex configuration, in which the first and second SCSI buses 220 and 240 are joined to form a single bus and a host computer 300 is attached to the single joined bus. The first SCSI bus 220 is joined to the second SCSI bus 240 by an external jumper cable 302, which contributes additional length to the overall bus. The other external connection on the second SCSI bus 240 is capped by an external terminator 304. In this simplex arrangement, the host computer 300 is able to access all eight disk drives 210—213 and 230—233 of the enclosure 200. In this mode, the host computer is also able to access both SEPs 252 and 254, because each has its own SCSI address. Typically, control of the enclosure 200 is partitioned between SEPs 252 and 254, while monitoring functions within the enclosure 200 are partitioned or redundantly performed. The simplex arrangement of adapter board 250 is therefore wasteful of enclosure processing capability.

FIG. 3 illustrates the enclosure 200 in a duplex arrangement or duplex mode. The enclosure 200 of FIG. 3 is the same as in FIG. 2; however, the external connections to the enclosure 200, and in particular the adapter board 250, differ in the duplex mode from the simplex mode. In the duplex mode, a second computer 306 is connected to the second SCSI bus 240. To comply with the SCSI termination requirements, external terminators 308 and 310 are connected to the other external connections of the first and second SCSI buses 220 and 240, respectively. In the duplex arrangement, the enclosure 200 provides two separate and independent disk storage systems. The first host computer 300 is able to access disk drives 210—213, as well as the first SEP 252, via the first SCSI bus 220. The first SEP 252 controls and monitors the enclosure 200 under the direction of and in communication with the first host computer 300. Meanwhile, the second computer 306 can access disk drives 230—233 via the second SCSI bus 240. The second SCSI bus 240 is also connected to the second SEP 254, which independently controls and monitors the enclosure 200 with respect to the second computer 306.

FIG. 4 illustrates a clustering mode or cluster arrangement for the disk drive enclosure 200. Again, the enclosure 200 is the same as shown in FIGS. 2 and 3; however, the external connections to the enclosure 200, and in particular to the adapter board 250, differ. In the clustering mode, the first host computer 300 is connected to the first SCSI bus 220, and the second computer 306 is connected to the second SCSI bus 240. Furthermore, the first SCSI bus 220 is externally connected to the second SCSI bus 240 by an external jumper cable 302. In this clustering arrangement, both the first host computer 300 and the second computer 306 can access all eight disk drives 210—213 and 230—233. Furthermore, both the first SEP 252 and the second SEP 254 are accessible from either computer. A clustering arrangement of the disk drive enclosure 200 is useful when the first and second computers 300 and 306 are tightly coupled (e.g., such as when they are clustered together) or when they simply require access to the same data storage.

The configurations of FIGS. 2—4 illustrate several problems that the present invention is capable of solving. First, there is wasteful redundancy of enclosure processing capability and SCSI addressing space. The adapter board 250 contains two active SEPs, regardless of whether both are needed. Only the duplex configuration of FIG. 3 requires that the SEPs 252 and 254 operate independently. In the other configurations, the second SEP 254 is not utilized to enhance the availability, fault-tolerance, or robustness of the enclosure processing capability. In particular, failover from an active SEP to a standby SEP is not possible. Furthermore, the second SEP 254 occupies one SCSI address that is therefore unavailable for use by a productive module or peripheral. A second problem is that hot-swapping of an SEP is not possible, because both SEPs are physically mounted on the same board. Instead, operation of the system must be halted in order to remove and replace an SEP or adapter board. A third problem is that setting up the adapter board 250 in different configurations requires operator intervention and external SCSI bus jumpers, which disadvantageously add to the total bus length. A fourth problem occurs in the cluster configuration of FIG. 4 when either the jumper cable 302 or one of the computers 300 or 306 becomes disconnected, resulting in an end of the bus, as seen by the remaining computer, being unterminated and therefore unusable. The present invention can be utilized to solve these and other problems.

SUMMARY OF INVENTION

The present invention is a device and method for enclosure processing that provides failover and hot-swapping capabilities. The present invention provides enclosure processing that is modular, flexible, and offers higher availability, fault-tolerance, and robustness with a minimum of operator intervention.

In one form, the present invention is an adapter containing a single enclosure processor. The adapter connects to peripheral buses within an enclosure, and the bus connections may be selective, such as through a repeater that can be selectively enabled or disabled. The adapter can be utilized in an enclosure alone or together with other adapters. A single adapter can be utilized in a simplex arrangement by connecting internally to the one or more buses internal to the enclosure. Multiple adapters can be used together in the same enclosure in duplex or cluster modes. In a duplex mode, each adapter connects to a subset of buses, where the subsets are non-intersecting with each other. In a cluster mode, at least some of the subsets overlap. In a cluster configuration, a first enclosure processor on a first adapter assumes an active status, while a second enclosure processor on a second adapter waits in a standby mode. The standby enclosure processor detects when the active enclosure processor has failed, misoperated, or been removed and automatically failsover, assuming the identity of the active enclosure processor and connecting itself appropriately, without disruption to the system. Hot-swapping of the adapter boards is therefore possible.

DISCLOSURE OF INVENTION

Figure 1:
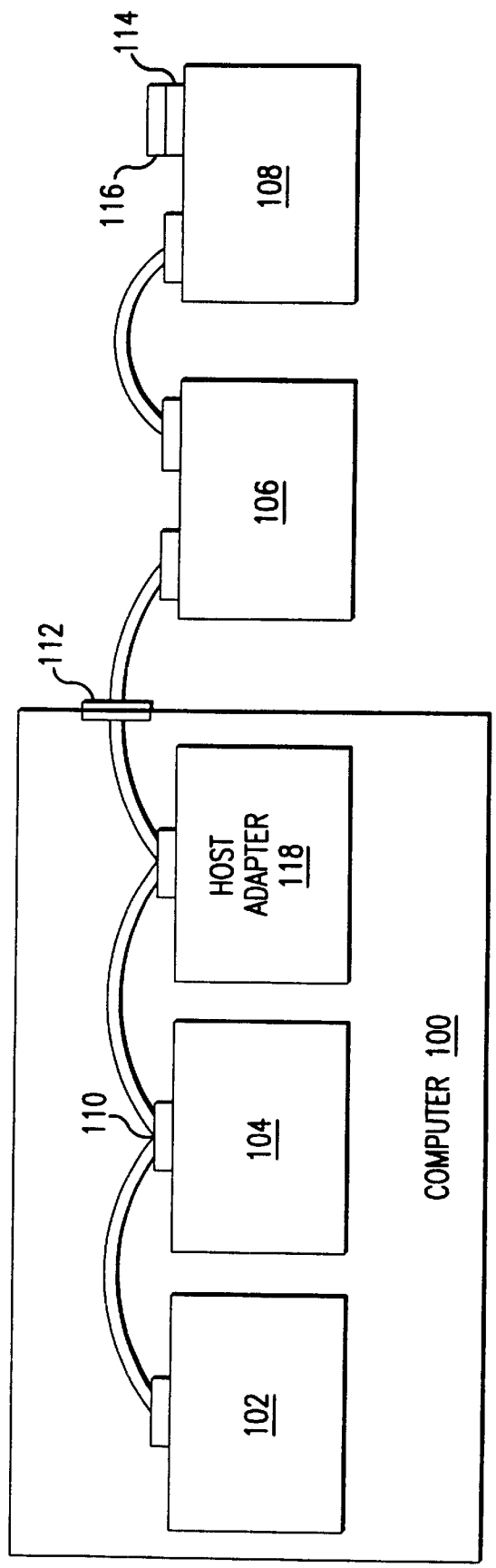
FIG. 1 is a block diagram of a general SCSI bus system.
Figure 2:
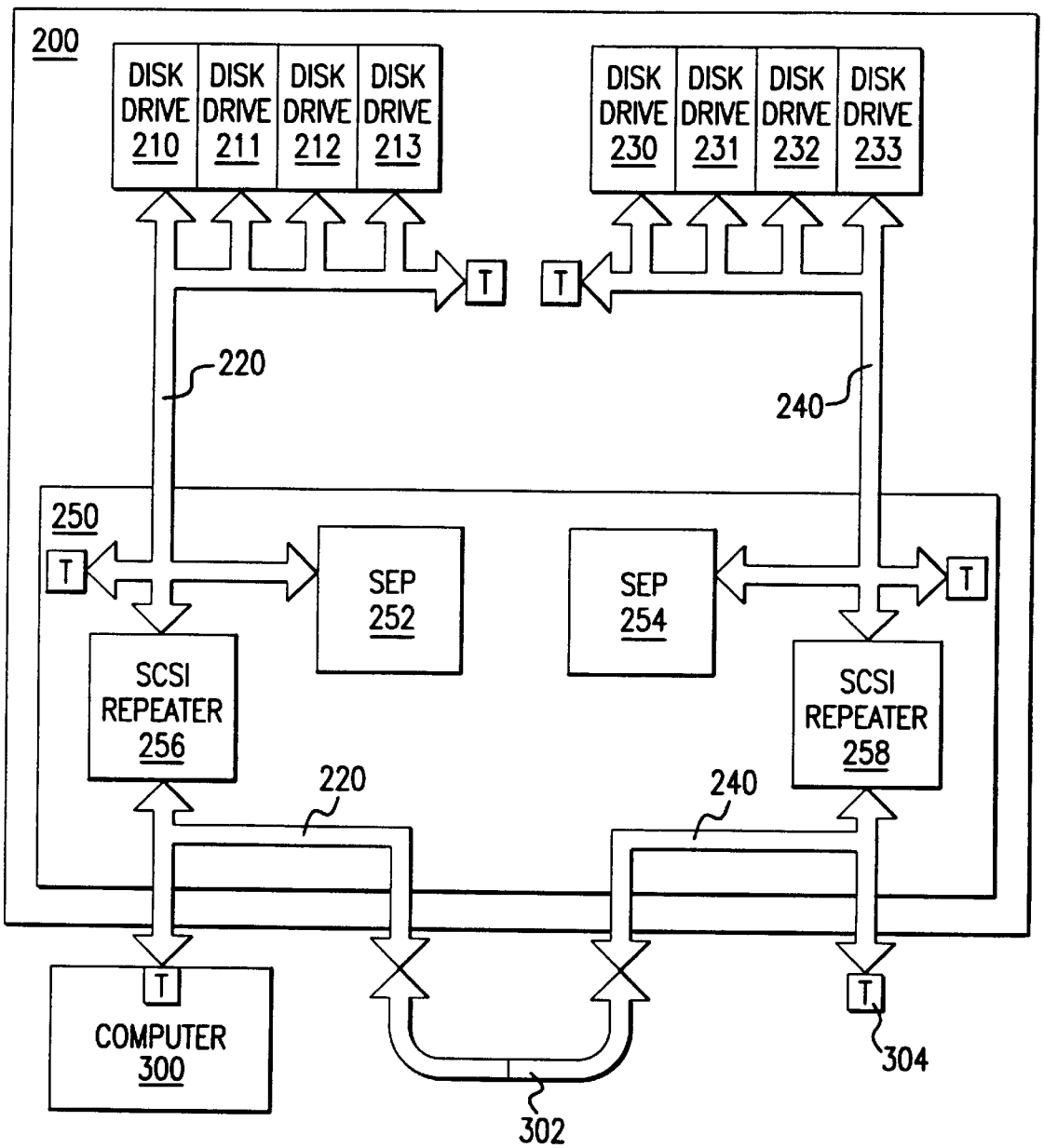
FIG. 2 is a remote disk drive system configured in a simplex mode.
Figure 3:
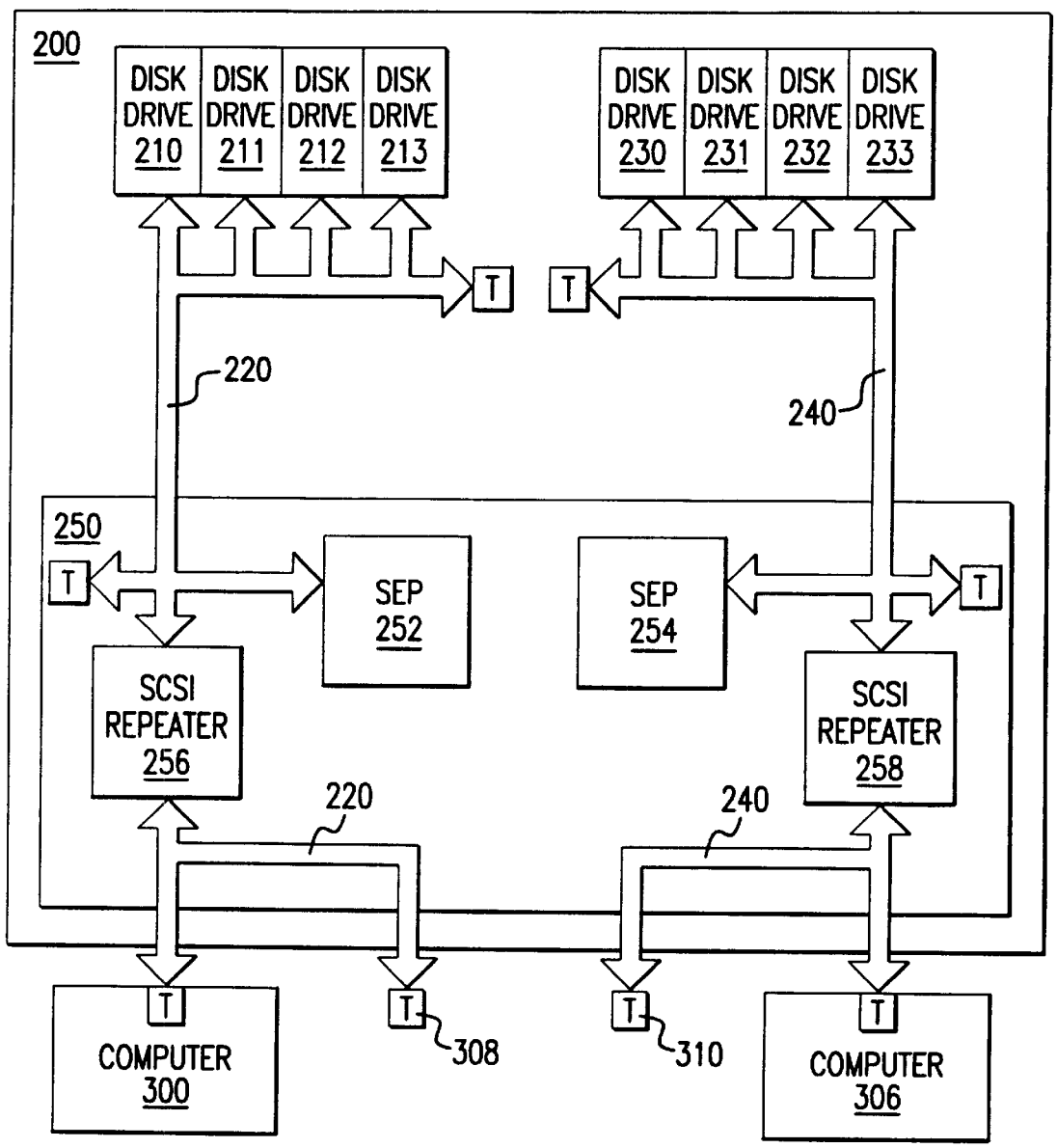
FIG. 3 is a remote disk drive system configured in a duplex mode.
Figure 4:
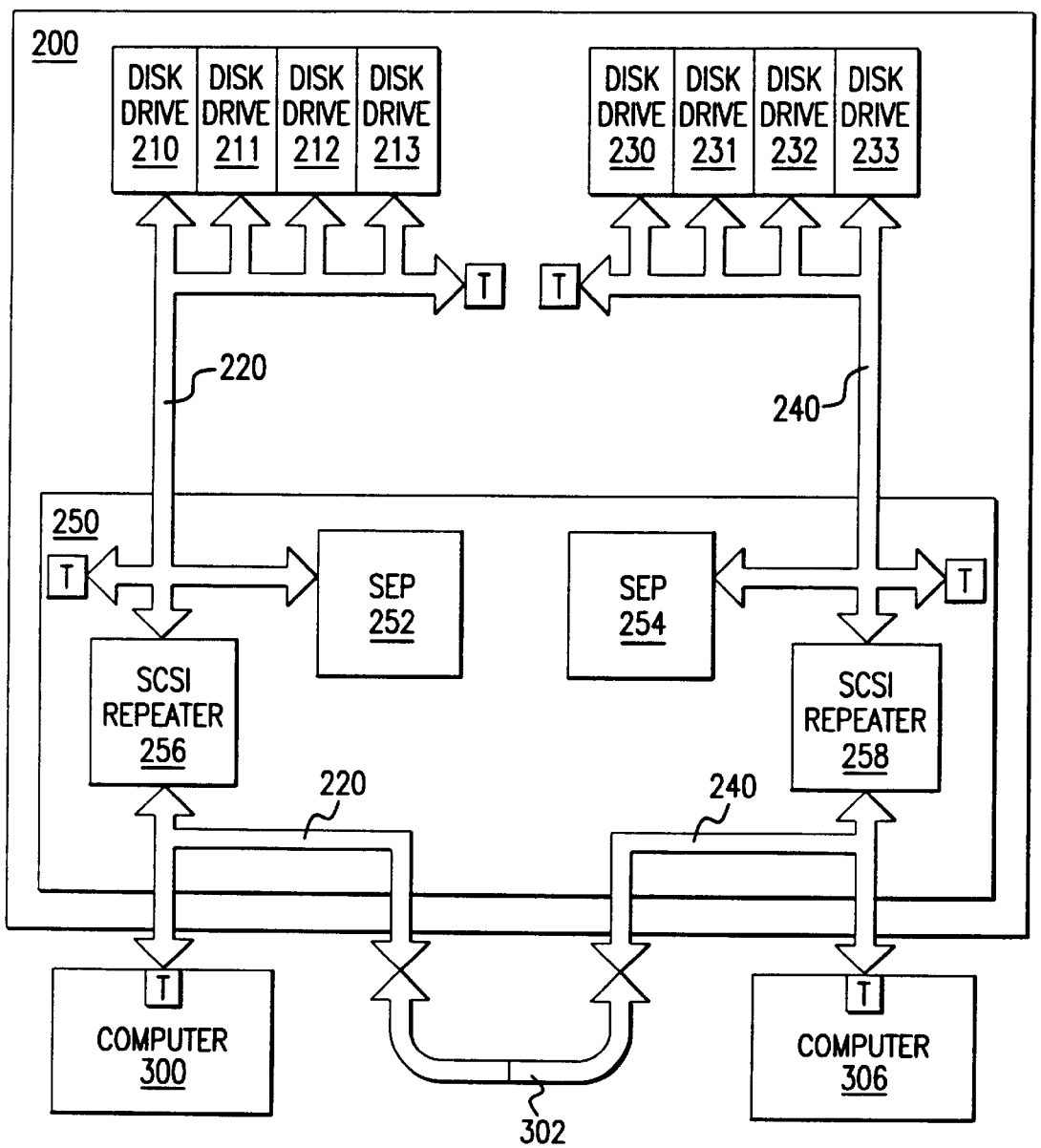
FIG. 4 is a remote disk drive system configured in a clustering mode.
Figure 5:
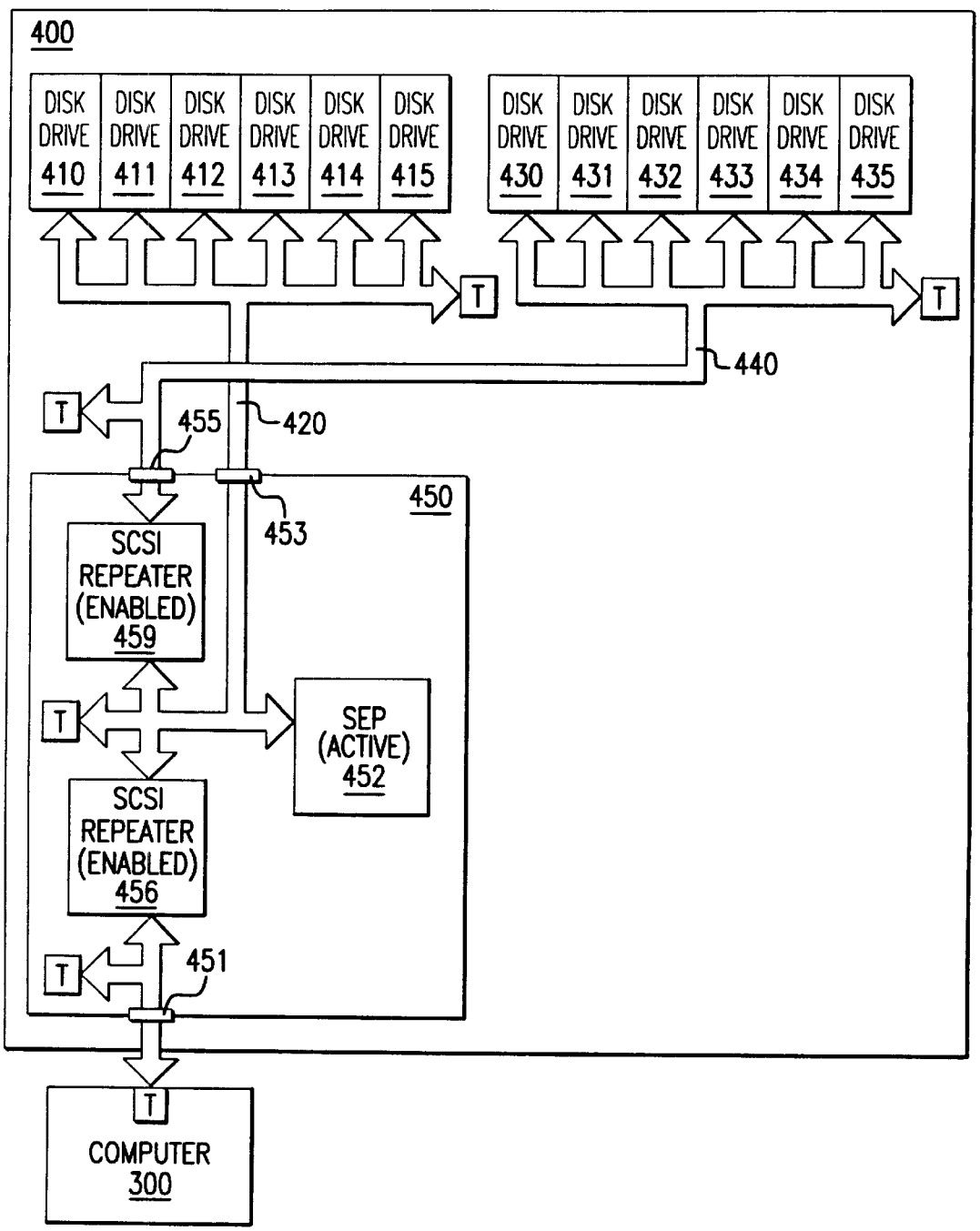
FIG. 5 is a remote peripheral system of the present invention configured in a simplex mode.
Figure 6:
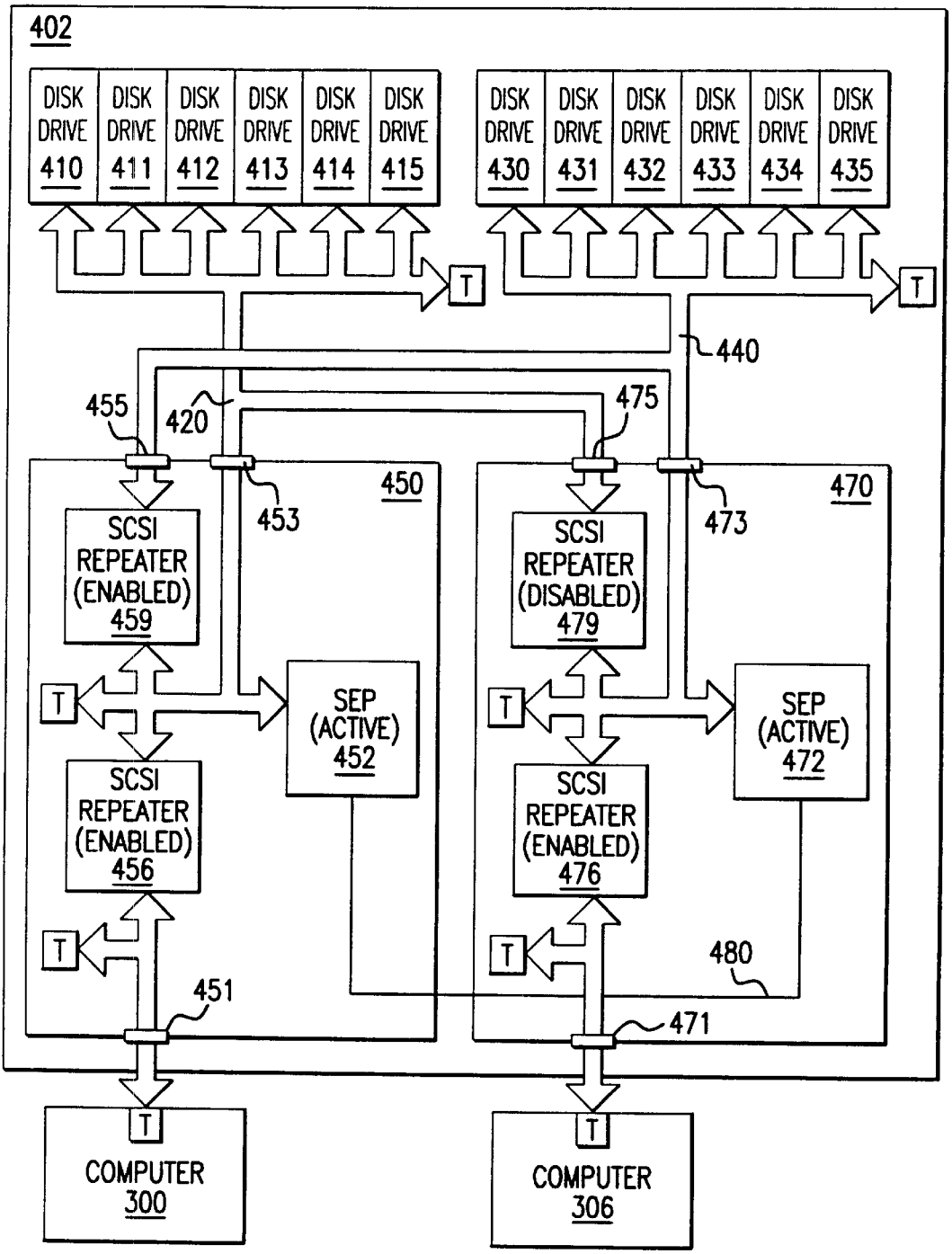
FIG. 6 is a remote peripheral system of the present invention configured in a duplex mode.
Figure 7:
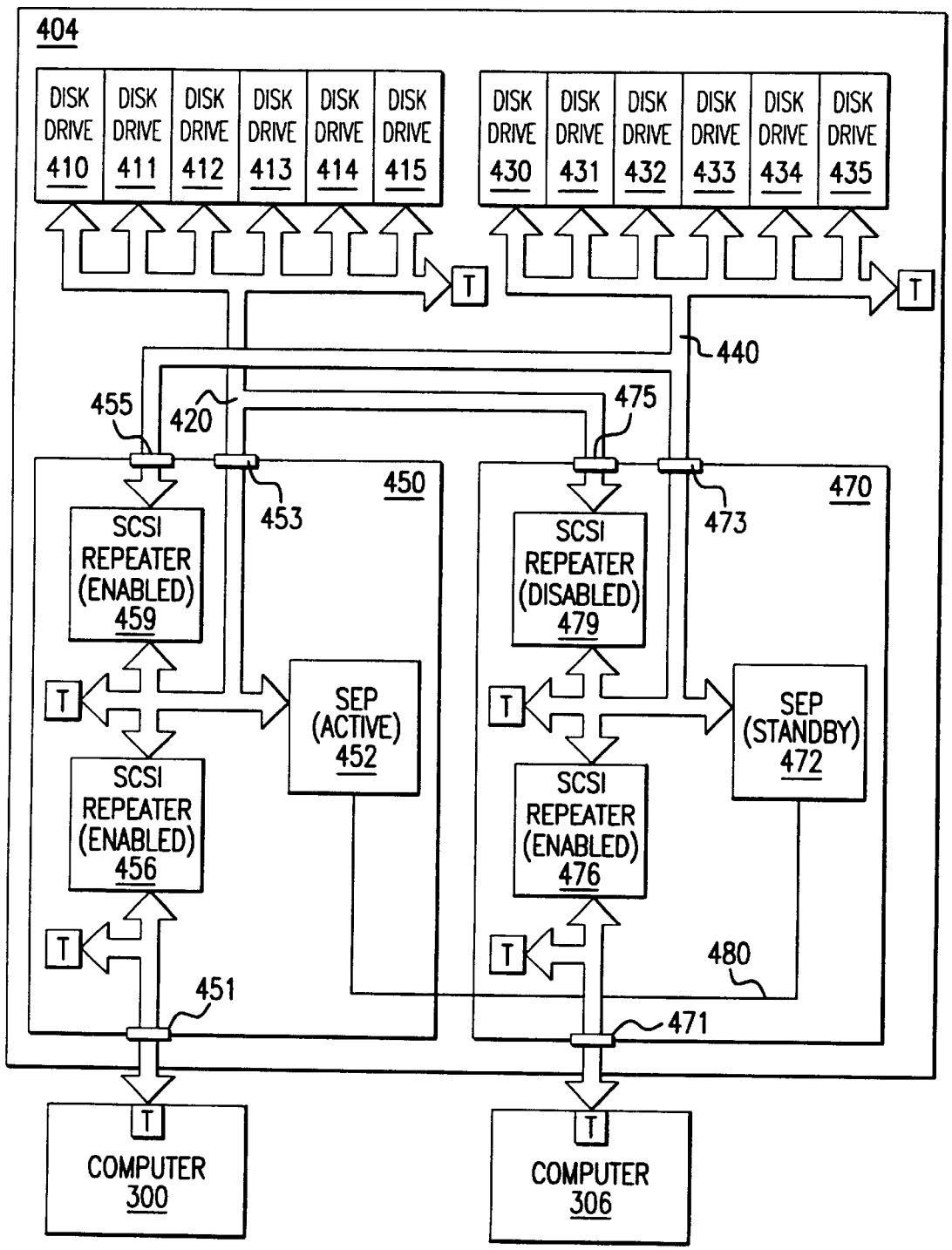
FIG. 7 is a remote peripheral system of the present invention configured in a clustering mode.

FIGS. 5–7 illustrate preferred embodiments of the present invention by showing logical connections between certain elements. FIGS. 5–7 are not circuit diagrams and do not represent physical layout of the invention. FIGS. 5–7 depict a remote disk storage enclosure 400, 402, or 404, respectively, containing six SCSI disk drive peripherals 410–415 on a first SCSI bus 420 and six SCSI disk drive peripherals 430–435 on a second SCSI bus 440. Though disk drives are illustrated, the peripherals could be any type of computer equipment, and the number of peripherals could be any number not exceeding the upper limit for SCSI modules.

In FIG. 5, the enclosure 400 is attachable to the outside world through an adapter 450 at a single external host connector 451. The adapter 450 contains a single SEP 452 and two peripheral connectors 453 and 455 that are internal to the enclosure, linking the adapter 450 to the two SCSI buses 420 and 440, respectively. All connectors (451, 453, and 455) support hot plug-in and unplugging (i.e., engagement and disengagement to/from the connectors while power is applied), according to well known practices in the art. The adapter 450 also contains two SCSI repeaters—a host or external connection repeater 456 near the external host connector 451 and a peripheral or internal cross-coupling repeater 459 near the internal peripheral connector 455. The internal cross-coupling repeater 459 and the internal peripheral connector 455 link the first SCSI bus 420 to the second bus 440. Depending upon whether a second adapter is present in the enclosure 400 and the settings of the adapter(s), the two SCSI bus systems of enclosure 400 can be utilized in a simplex, duplex, or cluster configuration, as will next be described.

FIG. 5 illustrates a simplex configuration. The external host repeater 456 is enabled in order to link the host computer 300 to the first SCSI bus 420. The cross-coupling repeater 459 is enabled in order to link internally the first SCSI bus 420 to the second SCSI bus 440. In this way, the host computer 300 is able to access all twelve disks drive peripherals 410—415 and 430—435 on what appears to be a single SCSI bus. Because the first SCSI bus 420 and the second SCSI bus 440 are joined internally, no external jumpers are necessary. That is, the only external connection is the indispensable one 451 between the host computer 300 and the adapter 450. Furthermore, because the connection between the first SCSI bus 420 and the second SCSI bus 440 is through the cross-coupling repeater 459, total bus length constraints are not violated and the internal buses 420 and 440 are electrically isolated.

In the simplex arrangement of FIG. 5, the SEP 452 performs enclosure processing with respect to all of the disk drive peripherals 410—415 and 430—435, and in fact, with respect to the entire enclosure. Enclosure processing, which entails monitoring and/or control, may be performed using a communication channel between the SEP 452 and the peripherals or other enclosure equipment being monitored or control. The SCSI buses 420 and 440 may provide this communication channel. Alternatively, other communication channels, such as serial connections, are possible.

FIG. 6 illustrates a duplex configuration. The enclosure 402 illustrated in FIG. 6 differs from the enclosure 400 illustrated in FIG. 5 by the addition of a second adapter 470. The second adapter 470 is just like the first adapter 450 and has part labeled in a similar manner. In FIG. 6, two host computers, the host computer 300 and the second computer 306, share the same enclosure 402. In this mode, the first host computer 300 can access the six disk drives 410—415 on the first SCSI bus 420 through the first adapter 450. Likewise, the second computer 306 can access the six disk drives 430—435 on the second SCSI bus 440 through a second adapter 470. To isolate the first SCSI bus 420 from the second SCSI bus 440, the cross-coupling repeaters 459 and 479 on the first and second adapters 450 and 470, respectively, are disabled. The first host computer 300 can also access the first SEP 452 on the first SCSI bus 420 for monitoring and controlling with respect to the enclosure 402 generally and the disk drives 410—415 specifically. Similarly, the second computer 306 can access the second SEP 472 for monitoring and controlling with respect to the enclosure 402 generally and the disk drives 430—435 specifically.

FIG. 7 illustrates a preferred embodiment of the invention in a clustering mode or cluster arrangement. FIG. 7 differs from the duplex arrangement of FIG. 6 in that repeater 459 on the first adapter 450 is enabled in the clustering arrangement of FIG. 7 and the second SEP 472 on the second repeater 470 is put in a standby. In this way, both computers 300 and 306 can access all disk drives 410—415 and 430—435. The host computer 300 can access disk drives 410—415 on the first SCSI bus 420 directly through the external connection repeater 456. The host computer 300 additionally can access the disk drives 430—435 on the second SCSI bus 440 through the external host connector 451 and the external connection repeater 456 and the internal cross-coupling repeater 459. The second computer 306 can access the disk drives 430—435 on the second SCSI bus 440 directly through the second external host connector 471 and the second external connection repeater 476. The second computer 306 can additionally access the disk drives 410—415 on the first SCSI bus 420 through the external connection repeater 476 and internal cross-coupling repeater 459. Likewise, the second computer 306 can access the active SEP 452 through the same chain of repeaters. Of course, the host computer 300 can directly access the SEP 452 on the first SCSI bus 420 directly through repeater 456. In this way the SEP 452 is a shared processor that is accessible to both computers 300 and 306. The second SEP 472 on the second adapter board 470 is likewise accessible from both computers 300 and 306; however, the second SEP 472 is normally in a standby state. In this configuration, each of SEPs 452 and 472 are set to perform enclosure processing with respect to the peripherals connected to both internal SCSI buses 420 and 440, although SEP 472 may perform this enclosure processing passively in a standby state until a failover occurs. In the event of a failure or deactivation of the first SEP 452, then the second SEP 472 can activate and take over the functions of enclosure monitoring and control with respect to the enclosure 404. The mechanism for this failover will be described next.

Figure 8:
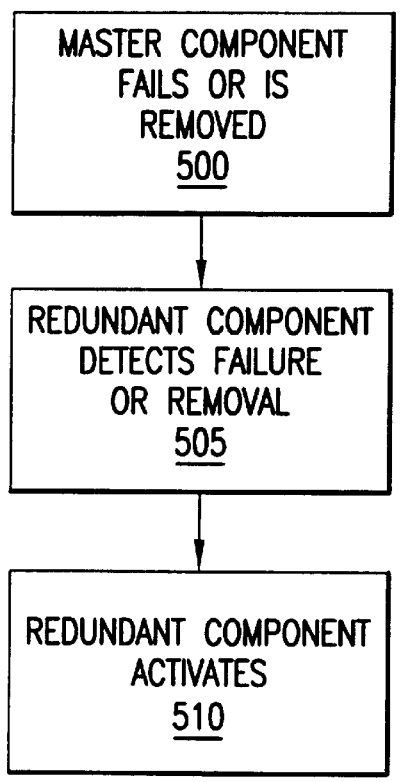
FIG. 8 is a flowchart of a failover method according to the present invention.

FIG. 8 is a flowchart of a failover process of the present invention. As applied to the embodiment illustrated in FIG. 7, the process proceeds as follows: Initially, the first SEP 452 is the active SEP, and the second SEP 472 is in a standby state. The failover process begins when the first SEP 452 fails or is removed, according to block 500. The failure may be complete or partial. The failure is detected by the second SEP 472, according to block 505. This detection is preferably accomplished by one or two mechanisms described below. When a failure is detected, the second SEP 472 activates and assumes the same identity (i.e., SCSI address) of the failed first SEP 452, according to block 510. In this way, the failover is seamless and transparent to the host computers 300 and 306, and availability of the enclosure 400 and its peripherals is enhanced.

Figure 9:
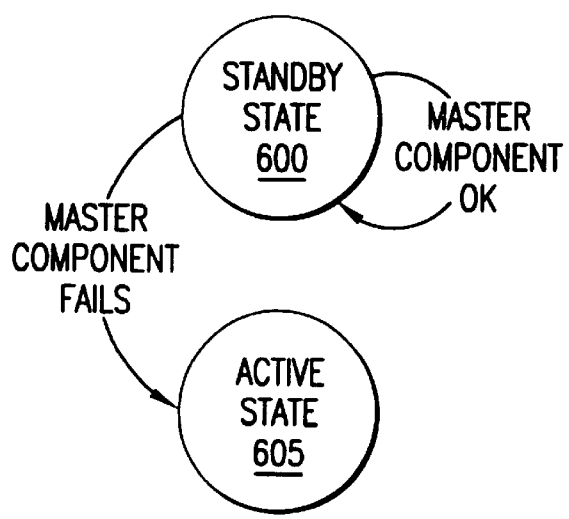
FIG. 9 is a state transition diagram for a failover method according to the present invention.

FIG. 9 is a state transition diagram for a redundant component during failover. In FIG. 9, two states of the second SEP 472 are shown—standby state 600 and active state 605. In the case when the redundant component is the second enclosure processor 472, transition from the standby state 600 to the active state 605 is caused by detection of failure of the first SEP 452. Otherwise, the second SEP 472 remains in the standby state 600.

In a first detection mechanism, the first SEP 452 and the second SEP 472 maintain periodic communication while the first SEP 452 is active. For example, the second SEP 472 may occasionally ping the first SEP 452 by sending a short message to the first SEP 452, which responds upon reception by sending a brief affirmative reply back to the second SEP 472. These ping messages may be transmitted via an I$^2$C (inter-IC (integrated circuit)) bus 480 between the first and second SEPs 452 and 472. Any communication channel between the first and second SEPs 452 and 472 could be utilized, but an I$^2$C bus is preferable because its two wire serial structure makes it extremely simple. Alternately, the second SEP 472 may be constantly in a listen-only mode while the first SEP 452 occasionally directs a brief message to the second SEP 472 to confirm that the first SEP 452 is active and operational. Other forms of periodic communication between the first and second SEPs 452 and 472 are possible, as those skilled in the art will readily appreciate. The needed frequency of the periodic communications is dictated by the requirement for failover to occur quickly enough that system operation is not severely impacted. It is permissible to experience a short disruption, during which time the first SEP 452 is in a failed state and the second SEP 472 is not yet active. During such minor a disruption, communications between the enclosure's SEP and one of the host computers 300 or 306 may be disabled. However, the communication protocol in use between the SEP and the host computers 300 or 306 should be able to handle a minor disruption by various means well known to those skilled in the art (e.g., retransmission after a SCSI selection timeout).

Another mechanism for detecting failure is receipt of an interrupt signal by the second SEP 472. The interrupt may originate from any source, including the first SEP 452, the host computer 300 or 306, or other hardware. In response to the interrupt signal, the second SEP 472 initiates processing to assume active status with the identity of the failed first SEP 452. Programming instructions that perform this processing may be stored as an interrupt procedure in memory associated with the second SEP 452. The memory may be internal to the second SEP 452 or external (not shown in the figures).

Failure detection by receipt of an interrupt signal and failure detection by a periodic communications scheme may operate together. The same interrupt procedure can perform processing in response to either detection mechanism. In the case of failure detection by receipt of an interrupt signal, the call to the interrupt procedure is hardware generated. In the case of failure detection by a periodic communications scheme, the call to the interrupt procedure is software generated. Other mechanisms for failure detection may be likewise combined in concert.

The failover capability of the enclosure processor enables hot-swapping of an adapter. Hot-swapping is removal and insertion of computer hardware without powering down the computer hardware or associated equipment. Hot-swapping allows computer equipment to be repaired, tested in isolation, and upgraded without disabling operation of the system and thereby decreasing availability. Hot-swapping of a critical piece of equipment is possible only when the system provides separable redundancy in that equipment. In addition, the equipment must be designed with the physically capability of removal and insertion while power is applied, according to well known practices in the art (e.g., connection of ground conductors, power conductor, then signal conductors in that order). Further, some mechanism for activity transition between redundant units during hot-swapping must be provided. The failover process of the present invention serves this purpose.

Failover, as described above, allows hot-swapping of the first adapter 450. Removal of the first adapter 450 causes a failure of the first SEP 452. This failure may manifest itself as loss of communication in a periodic ping scheme, or removal may trigger a SCSI reset signal that can be hard-wired into an interrupt input of the second SEP 472. Generation of a suitable SCSI reset signal is described in commonly assigned patent application docket No. 10981624-1, entitled "State Activating One Shot with Extended Pulse Timing for Hot-Swap Applications," and hereby incorporated by reference. Alternatively, removal may trigger an analog hardwired signal. In any case, the second SEP 472 detects the failure and activates itself while performing other necessary adjustments to the adapter 470, such as enabling the internal cross-coupling repeater 479. Insertion of the first adapter 450 back into the enclosure 404 causes the first adapter 450 to self configure (as described below), which would result in disabling cross-coupling repeater 459 and setting SEP 452 into a standby mode.

Self configuration also allows hot-swapping of an adapter in the standby state. Consider, for example, hot-swapping of the adapter 470 in the initial configuration of FIG. 7. In that case, SEP failover is not necessary. The adapter 470 is simply removed, and, after reinsertion, it automatically configures itself back into the same condition by enabling the external connection repeater 476, disabling the internal cross-coupling repeater 479 and setting the SEP 472 into a standby mode.

Automatic configuration of the first adapter 450, for example, is possible with knowledge of (1) whether the second adapter 470 is plugged in the enclosure 404 and (2) whether clustering is enabled or disabled. The presence of the second adapter 470 in the enclosure 404 may be sensed in any number of ways within the skill of an ordinary engineer in the art. For instance, presence of a second adapter in the enclosure can close a simple conduction pathway to create a signal line to the first adapter. Clustering can be enabled or disabled by a mechanical switch setting, such as a DIP (dual in-line package) switch, on the adapter 450. Alternatively, SCSI commands or host computer commands can communicate these two pieces of information to the adapter 450.

The terms and descriptions used herein are set forth by way of illustration only and are not meant as limitations. In particular, although the invention has been described with reference to SCSI buses and SCSI peripherals, the invention may work equally well with other buses and peripherals. Further, although the invention has been described with reference to dual bus peripheral enclosures, the invention is operable with enclosures having any number of buses. One of ordinary skill in the art will appreciate that the exemplary dual bus systems described above easily generalizes to any number of buses. Those skilled in the art will recognize that these are other variations are possible within the spirit and scope of the invention as defined in the following claims.

What is claimed is:

1. A method for automatic failover from a first enclosure processor to a second enclosure processor in a computer peripheral enclosure, the first enclosure processor initially in an active state and the second enclosure processor initially in a standby state, the method comprising:

communicating periodically between the second enclosure processor and the first enclosure processor;

detecting a communication failure of the first enclosure processor;

activating the second enclosure processor in response to the detecting step; and selectively activating one or more repeaters, each repeater selectively linking one of a plurality of connectors to at least one of the enclosure processors.

2. The method of claim 1 further comprising:

generating an interrupt signal; and wherein the detecting step comprises receiving the interrupt signal.

3. The method of claim 1 further comprising:

removing the first enclosure processor from the enclosure, thereby causing failure of the first enclosure processor.

4. A computer peripheral adapter for use in a computer peripheral enclosure containing a plurality of internal buses, each internal bus capable of connecting to at least one peripheral, the adapter comprising:

a plurality of peripheral connectors, each peripheral connector capable of connecting internally to one of the plurality of internal buses in the enclosure;

an enclosure processor, wherein the enclosure processor performs enclosure processing with respect to a first peripheral connected to a first of the plurality of peripheral connectors and with respect to a second peripheral connected to a second of the plurality of peripheral connectors; and one or more peripheral repeaters, each peripheral repeater selectively linking one of the plurality of peripheral connectors to the enclosure processor.

5. The adapter of claim 4 wherein the adapter is a SCSI adapter.

6. The adapter of claim 4 further comprising:

a host connector connected to the enclosure processor; and a host repeater linking the host connector to the enclosure processor.

7. The adapter of claim 4 wherein the adapter is an adapter board.

8. The adapter of claim 4 wherein the adapter is hot-swappable.

9. A computer peripheral enclosure comprising:

a plurality of internal buses, each internal bus capable of connecting to at least one peripheral;

a first enclosure processor, wherein the first enclosure processor performs enclosure processing with respect to a first peripheral connected to a first of the plurality of internal buses and with respect to a second peripheral connected to a second of the plurality of internal buses; and one or more peripheral repeaters, each peripheral repeater selectively linking one of a plurality of peripheral connectors to the first enclosure processor.

10. The enclosure of claim 9 wherein the first enclosure processor performs enclosure processing with respect to respective peripherals connected to each of the respective plurality of internal buses.

11. The enclosure of claim 9 further comprising:

a second enclosure processor, wherein the second enclosure processor performs enclosure processing with respect to a first peripheral connected to a first of the plurality of internal buses and with respect to a second peripheral connected to a second of the plurality of internal buses.

12. The enclosure of claim 11 wherein the first enclosure processor is in an active state and the second enclosure processor is in a standby state.

13. The enclosure of claim 11 wherein the first enclosure processor performs enclosure processing with respect to respective peripherals connected to a respective first subset of the plurality of internal buses, and the second enclosure processor performs enclosure processing with respect to respective peripherals connected to a respective second subset of the plurality of internal buses.

14. The enclosure of claim 13 wherein the first subset and the second subset are intersecting.

15. The enclosure of claim 12 further comprising:

a communication channel between the first enclosure processor and the second enclosure processor.

16. The enclosure of claim 15 wherein the communication channel is an $I^2C$ bus.

17. The enclosure of claim 9 further comprising:

a plurality of peripherals, each peripheral connected to one of the plurality of internal buses.

18. The enclosure of claim 17 wherein the peripherals are disk drives.

* * * * *